United States Patent
Lee et al.

(10) Patent No.: US 8,170,751 B2
(45) Date of Patent: May 1, 2012

(54) DETECTION OF DRIVER INTERVENTION DURING A TORQUE OVERLAY OPERATION IN AN ELECTRIC POWER STEERING SYSTEM

(75) Inventors: Yong H. Lee, Troy, MI (US); Jihan Ryu, Rochester Hills, MI (US); Weiwen Deng, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 687 days.

(21) Appl. No.: 12/336,819

(22) Filed: Dec. 17, 2008

(65) Prior Publication Data

US 2010/0152952 A1 Jun. 17, 2010

(51) Int. Cl.
*B62D 5/04* (2006.01)
(52) U.S. Cl. ............... 701/42; 180/446; 180/204
(58) Field of Classification Search .......... 701/41, 701/42; 180/443, 446, 204
See application file for complete search history.

(56) References Cited

U.S. PATENT DOCUMENTS

| 6,731,925 | B2 | 5/2004 | Naboulsi |
| 7,444,217 | B2 | 10/2008 | Matsuoka |
| 7,835,836 | B2 * | 11/2010 | Bolourchi et al. ............ 701/41 |
| 2008/0255727 | A1 | 10/2008 | Lee |

FOREIGN PATENT DOCUMENTS

| DE | 102004057262 A1 | 6/2006 |
| DE | 102007039332 A1 | 2/2008 |
| DE | 102008040592 A1 | 1/2010 |
| EP | 1829728 A1 | 5/2007 |

* cited by examiner

*Primary Examiner* — Kevin Hurley
(74) *Attorney, Agent, or Firm* — Quinn Law Group, PLLC

(57) ABSTRACT

A method for controlling an assisted steering maneuver in an electric power steering (EPS) system includes modeling steering dynamics during a torque overlay operation to generate a dynamic steering model (DSM), measuring vehicle operating values, and detecting a driver intervention in the torque overlay operation based on the DSM and the vehicle operating values. The torque overlay operation is overridden when driver intervention is detected, allowing the driver to regain control of the steering maneuver. A vehicle includes a steering wheel, a steering assist mechanism, and an EPS system having an electronic control unit (ECU) adapted to determine a present intent of a driver of the vehicle to interrupt application of the TOC based on a vehicle operating value transmitted by the driver to the steering wheel. The ECU is operable for interrupting the torque overlay operation when the present intent of the driver is determined.

18 Claims, 3 Drawing Sheets

DETECTION OF DRIVER INTERVENTION DURING A TORQUE OVERLAY OPERATION IN AN ELECTRIC POWER STEERING SYSTEM

TECHNICAL FIELD

This invention relates generally to the automatic control of an electric power steering (EPS) system in a vehicle, and in particular to a method and an apparatus for controlling vehicle steering by detecting a driver intervention in a torque overlay operation during a threshold EPS-assisted steering maneuver.

BACKGROUND OF THE INVENTION

Steering functionality in an automotive vehicle is typically enabled via a series of mechanical linkages between a steering input device, e.g., a steering wheel, and the front road wheels of the vehicle. For example, in a conventional rack-and-pinion device, rotation of the steering wheel rotates a pinion gear within a pinion housing. The pinion gear is continuously engaged along a series of notches or teeth of an elongated rack portion of the rack-and-pinion device. Tie rods connect the rack to the front road wheels, such that any rotation of the steering wheel ultimately forces or moves the rack left or right as needed to achieve the desired orientation of the road wheels during a steering maneuver. The rack-and-pinion device can be configured to produce a desired steering ratio to optimize steering performance, depending largely on the number and design of the pinion gears used therein.

In an electric power steering (EPS) system in particular, such as an exemplary dual rack-and-pinion style EPS system as described herein, movement of the rack portion of the rack-and-pinion device described above is electrically assisted via a controlled application of a variable motor torque from an electric steering motor, with an applied torque for steering of the vehicle also selectively adjusted via a torque overlay command or TOC as determined by onboard control logic. That is, the level of steering "assist" is determined via an EPS electronic control unit or ECU. Within an EPS system, vehicle speed and steering wheel dynamics such as steering angle and steering torque are continuously monitored to determine how much steering assist is required for a particular steering maneuver. Once the ECU has determined an appropriate amount of assist to apply in a given scenario, the output of the steering motor is varied to produce a corresponding amount and direction of rotation, thus modifying the motion of the rack. The level of assist can vary depending upon changes in vehicle speed and other dynamic inputs, such as but not limited to signals or inputs from an electronic stability control and/or an electronic traction control system aboard the vehicle.

A state of the art EPS system can provide multiple operating modes or states depending on the required application and/or the level of assist. During normal steering during which a driver applies a positive torque to the steering wheel, the EPS system can assist the right/left steering direction. Additionally, an EPS system can assist the rate of return of the steering wheel to a center or neutral position upon completion of a turning maneuver, or can help maintain a lane position of the vehicle within minimal or no steering input from the driver by means of the torque overlay command (TOC). Finally, some EPS systems have additional modes, e.g., damping and/or overload or protection modes, that each provides an additional safeguard against overload or overheating of the steering motor, and/or provide an optimized stability response.

During any of these exemplary EPS modes or states, the delivery or transmission of at least some level of assist from the ECU can be expected. In an active torque overlay operation, i.e., when a torque overlay command (TOC) is actively occurring in addition to a calculated amount of motor torque from the steering motor, it is expected that the steering torque from a driver to the steering wheel is kept at a relative minimum, down to and possibly including a zero value. In other words, a driver may simply grip the wheel lightly and passively follow any autonomous rotation of the steering wheel under control of the EPS system without actively applying a steering torque to the steering wheel, or by applying only a minimal amount of steering torque. During certain collision avoidance and/or stability steering maneuvers, however, the driver may wish to rapidly establish full authority or control over the steering maneuver.

SUMMARY OF THE INVENTION

Accordingly, a control method is provided for use with an electric power steering (EPS) system to selectively and smoothly override or abort a torque overlay operation during an EPS maneuver, i.e., during an EPS-assisted steering maneuver occurring during the application of a torque overlay command (TOC). During an EPS-assisted steering maneuver, a driver should feel comfortable releasing or surrendering steering authority to the ECU, and should be confident that manual control or authority can be quickly regained from the ECU whenever the driver might deem necessary or desirable. However, during a transient period after attempting to regain steering authority, and through the steering column or otherwise, a driver may perceive an undesirable feedback response or feel as the EPS system attempts to resist or override the driver's steering effort in any way.

Therefore, the method of the invention includes determining the driver's present intention to abort or override the torque overlay operation during the EPS-assisted steering maneuver. Certain vehicle input signals are continuously monitored and processed as set forth herein, and when a meaningful variance or difference from a simulated or calculated steering value is determined, the torque overlay operation can be automatically aborted or overridden to ensure a smooth transition between the torque overlay operation and a standard or default level of EPS assist.

In particular, the steering control method can be used aboard a vehicle having a steering wheel and an electric power steering (EPS) system operable for modifying a final steering angle of the vehicle by selectively applying a variable motor torque and, as needed, a torque overlay command (TOC) to modify a driver's steering steering torque and steering angle. The method is executed via an algorithm that is resident in or accessible by the EPS electronic control unit or ECU.

A set of dynamics of the steering wheel is first modeled during a threshold low torque and/or "hands off" steering condition or EPS state, via a second order transfer function or other suitable means, in order to generate a dynamic steering model or DSM as a baseline data set. A set of vehicle signals is measured or detected, and then relayed to the ECU or a separate intervention detection unit for use by the algorithm. A present intention of the driver to presently exert a substantial manual control or authority over the steering maneuver, and thus to override or abort a torque overlay operation, is determined based on the comparison between output signals from the DSM and the set of vehicle signals, some of which are filtered through one of a low-pass filter or a high-pass filter to isolate a noise/signal component thereof, as explained herein. When such an intention is determined, the method automatically executes a control action, such as automatically aborting or overriding the torque overlay operation of the EPS system during the steering maneuver.

A vehicle includes a steering wheel, a steering mechanism such as a dual rack-and-pinion device or other suitable steering mechanism, an electric power steering (EPS) system operable for applying a torque overlay command (TOC) via a steering motor during an EPS maneuver, and an electronic control unit (ECU). The ECU determines a present intent or desire of a driver of the vehicle to interrupt or override application of the TOC based on a set of input signals. The ECU is also operable for overriding or aborting the application of the TOC whenever the present intent or desire of the driver to execute such an override of the torque overlay operation is determined.

The above objects, features, and advantages, and other objects, features, and advantages, of the present invention are readily apparent from the following detailed description of the best mode for carrying out the invention when taken in connection with the accompanying drawings.

DETAILED DESCRIPTION OF THE PREFERRED EMBODIMENT

Figure 1:
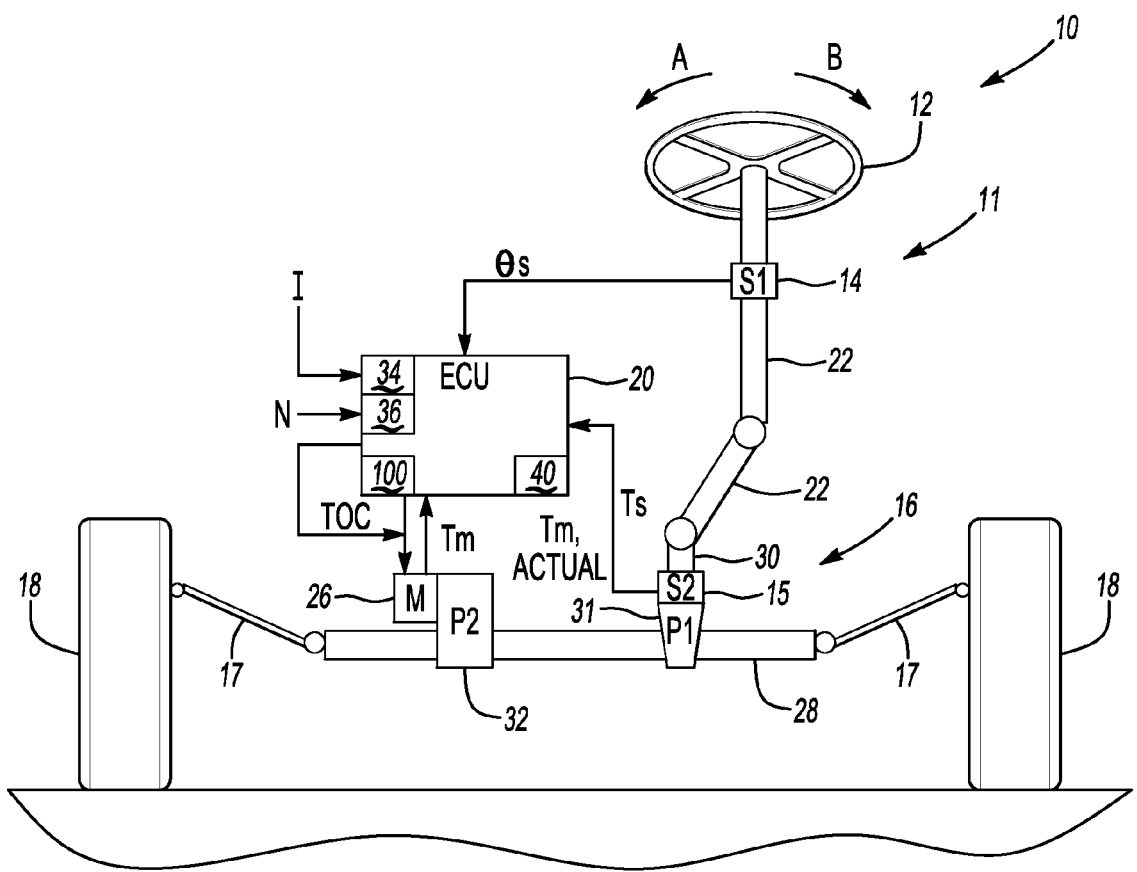
FIG. 1 is a schematic illustration of a vehicle having an electric power steering (EPS) system in accordance with the invention.

Referring to the drawings, wherein like reference numbers correspond to like or similar components throughout the several figures, and beginning with FIG. 1, a vehicle 10 includes a rotatable steering wheel 12 operable for steering the vehicle 10. That is, the steering wheel 12 can be alternately rotated in the directions indicated by the arrows A and B by a driver (not shown) of the vehicle 10, with rotation of the steering wheel 12 ultimately steering a set of road wheels 18. While an annular or ring-shaped steering wheel 12 is shown in FIG. 1, non-annular steering input devices capable of steering the vehicle 10 can also be used without departing from the intended scope of the invention.

The steering wheel 12 is coupled to the road wheels 18 via a steering column 11 containing a set of linkages 22, a steering system 16, and a set of tie rods 17. In the exemplary embodiment of FIG. 1, the steering system 16 is configured as an electric power steering (EPS), and in particular an EPS-assisted, dual rack-and-pinion steering system that is specially adapted for use with an EPS electronic control unit (ECU) 20 having overall electric power steering (EPS) system control authority, as well as an algorithm 100 for determining a driver intervention in an EPS-assisted steering maneuver as explained below.

As will be understood by those of ordinary skill in the art, an EPS system can electrically assist a driver in the steering of a vehicle by applying a variable motor torque command ($T_M$) to a steering motor (M) 26 and, as needed, a torque overlay command (TOC) which ultimately alters or affects the value of the motor torque command ($T_M$) during the EPS-assisted steering maneuver. The TOC as determined by the ECU 20 or that is externally provided to the ECU 20 can therefore selectively modify a driver's steering signals that are input at the steering wheel 12, while in certain EPS operating modes or states the steering motor 26 can respond to the motor torque command ($T_M$) alone according to predetermined EPS control logic or an EPS map 34.

A measurable steering angle ($\theta_S$) can be commanded as one of a set of vehicle performance values by a driver of the vehicle 10 to the steering wheel 12, with the steering angle ($\theta_S$) having both a detectable amplitude and a detectable sign, as will be understood by those of ordinary skill in the art. An angle sensor (S1) 14 is therefore adapted to sense, measure, detect, or otherwise determine the amplitude and sign of the steering angle ($\theta_S$), and to relay these values to the ECU. Also, a toque sensor (S2) 15 is provided aboard the vehicle 10, with the torque sensor 15 adapted to sense, measure, detect, or otherwise determine the level of steering torque (Ts) generated within a torsion bar 30 of the steering system 16 as another of the set of vehicle performance values. The steering torque (Ts) describes an amount of torsion generated in the torsion bar 30 between the various linkages 22 in the steering column 11 and a pinion gear (not shown) contained within a first pinion gear housing (P1) 31 in the dual rack-and-pinion device of FIG. 1.

In addition to the torsion bar 30 and the steering motor 26, the steering system 16 also includes a rack 28 having teeth or splines (not shown), and a second pinion housing (P2) 32 containing a second pinion gear (not shown). The steering motor 26 is mounted with respect to the second pinion housing 32, and is operable for rotating the second pinion gear contained therein at a variable amplitude and sign, as determined by the ECU 20. The ECU 20 is in electrical communication with the angle sensor 14 such that the steering angle ($\theta_S$) and steering torque ($T_S$) are made available to the ECU 20, as well as to the algorithm 100 that is readily accessible by the ECU 20. While the ECU 20 and the algorithm 100 are shown in FIG. 1 as being collocated, the algorithm 100 can also be positioned separately from the ECU 20 depending on the design of the vehicle 10, provided the functionality of the algorithm 100 remains readily available to the ECU 20.

Still referring to FIG. 1, the ECU 20 ultimately calculates and controls the output of the steering motor 26 by generating the motor torque command ($T_M$), which as noted above can vary in amplitude and sign depending on the required level of EPS assist as determined by the ECU 20. The motor torque command ($T_M$) is based at least partially on the steering torque ($T_S$). Additionally, to respond to a transient increase or decrease in required steering response, the ECU 20 can utilize control logic to generate a torque overlay command (TOC) which can add to or subtract from the motor torque command ($T_M$) calculated by the ECU 20 in its usual operation, as determined via the EPS map 34 and/or other control logic, lookup tables, etc. The motor output torque, whether or not modified by a TOC, is transmitted to the pinion gear (not shown) of the second pinion housing 32, thereby pushing or moving the rack 28 right or left as needed to steer the road wheels 18.

The ECU 20 includes a microprocessor unit 36 that receives and processes a set of vehicle performance values including the steering angle ($\theta_S$) and the steering torque ($T_S$), and that continuously monitors the speed (arrow N) of the vehicle 10, as well as other miscellaneous system values (I), e.g., stability and/or traction control signals, etc. The ECU 20 can be configured as a distributed or a central control module having such control modules and capabilities as might be necessary to execute all required EPS functionality aboard the vehicle 10 in the desired manner, including any intervention detection unit for executing the algorithm 100.

Likewise, the ECU 20 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Any algorithms resident in the ECU 20 or accessible thereby, including the algorithm 100, can be stored in ROM and executed to provide the respective functionality.

Figure 2:
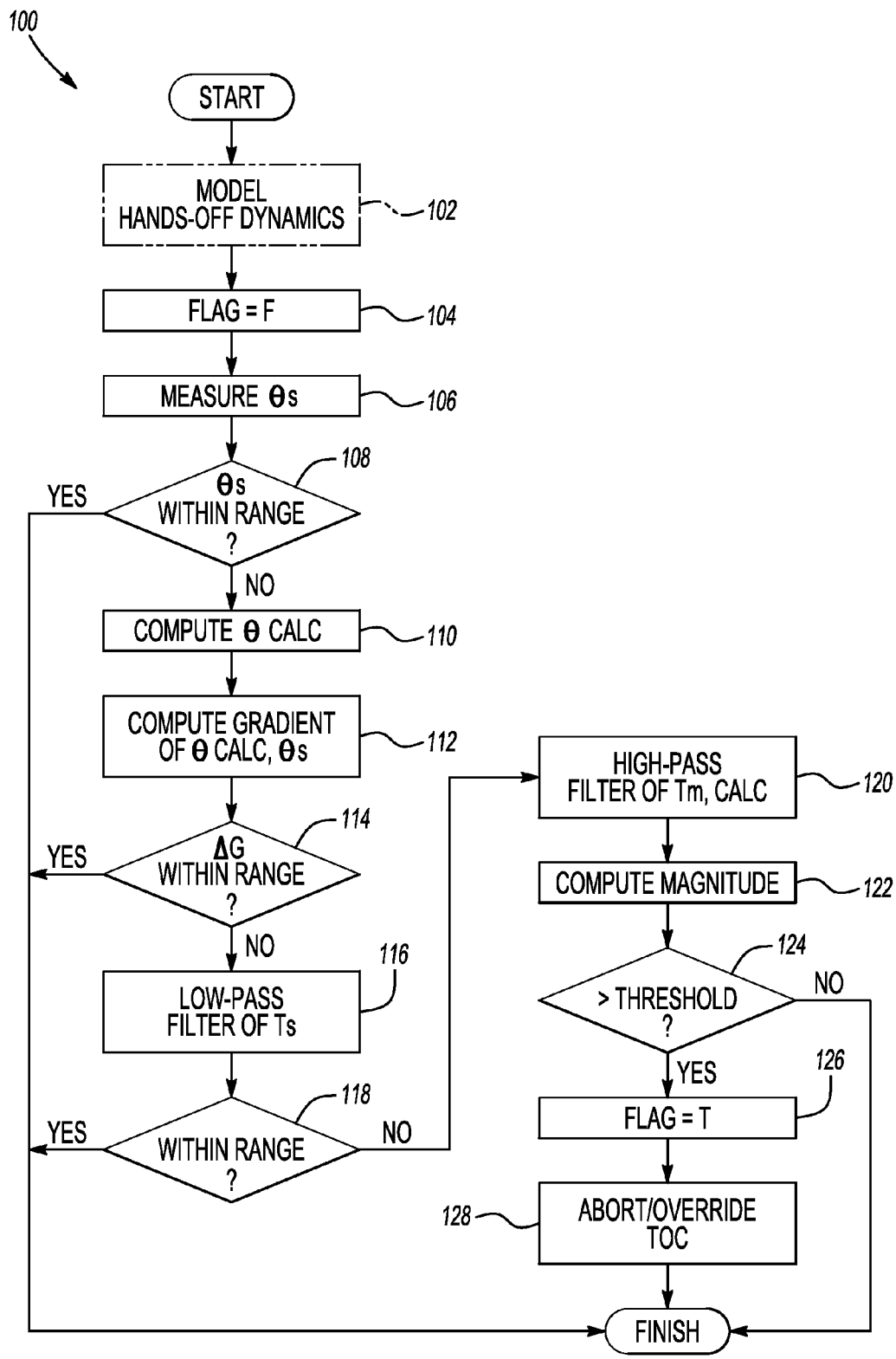
FIG. 2 is a graphical data flow diagram describing a method of controlling the EPS of the vehicle of FIG. 1.

Referring to FIG. 2, and with reference to the various components shown in FIG. 1, the algorithm 100 provides a method for controlling the EPS-assist functionality of the vehicle 10 of FIG. 1. In particular, the algorithm 100 provides a control method suitable for detecting driver intervention to selectively and smoothly abort or override a torque overlay operation during an active EPS maneuver, i.e., an electrically-assisted steering maneuver occurring during application of a torque overlay command (TOC). The result of execution of the algorithm 100 is a determination of a driver's present "intention" to override or abort the torque overlay operation, and to quickly and smoothly exert manual control or authority over the steering of the vehicle.

Beginning with step 102, shown in phantom to represent that the step is executable offline via one or more calibration vehicles with the results stored in memory within the ECU 20 or at an another accessible location aboard the vehicle 10, the steering dynamics of the vehicle 10 are modeled during a threshold EPS state. Specifically, step 102 involves the modeling of a "hands-off" or non-intervention condition or state. As used herein, the terms "hands-off" and "non-intervention" refer to an active EPS-assist mode or state during which the driver's hands are effectively removed or decoupled from the steering wheel 12 of FIG. 1. That is, the driver is either very loosely gripping the steering wheel 12 while the EPS system autonomously steers the vehicle 10 via an applied motor torque during a threshold steering maneuver, such as but not limited to autonomous parking or lane position maintenance, or is loosely following the rotational motion of the steering wheel 12 without concurrently applying at least a threshold amount of torque to the steering wheel 12.

As will be understood by those of ordinary skill in the art, when the EPS system is providing any level of steering assistance during maintenance of a lane position, during an automatic lane change, during autonomous parking, etc., the driver is required to have his or her hands off of the steering wheel 12, or to otherwise follow the rotation or movement of the steering wheel 12 without applying a significant amount of resistance torque thereto. These "hands-off" conditions are therefore modeled to determine a set of reference or baseline values in accordance with the invention.

Figures 3A, 3B:
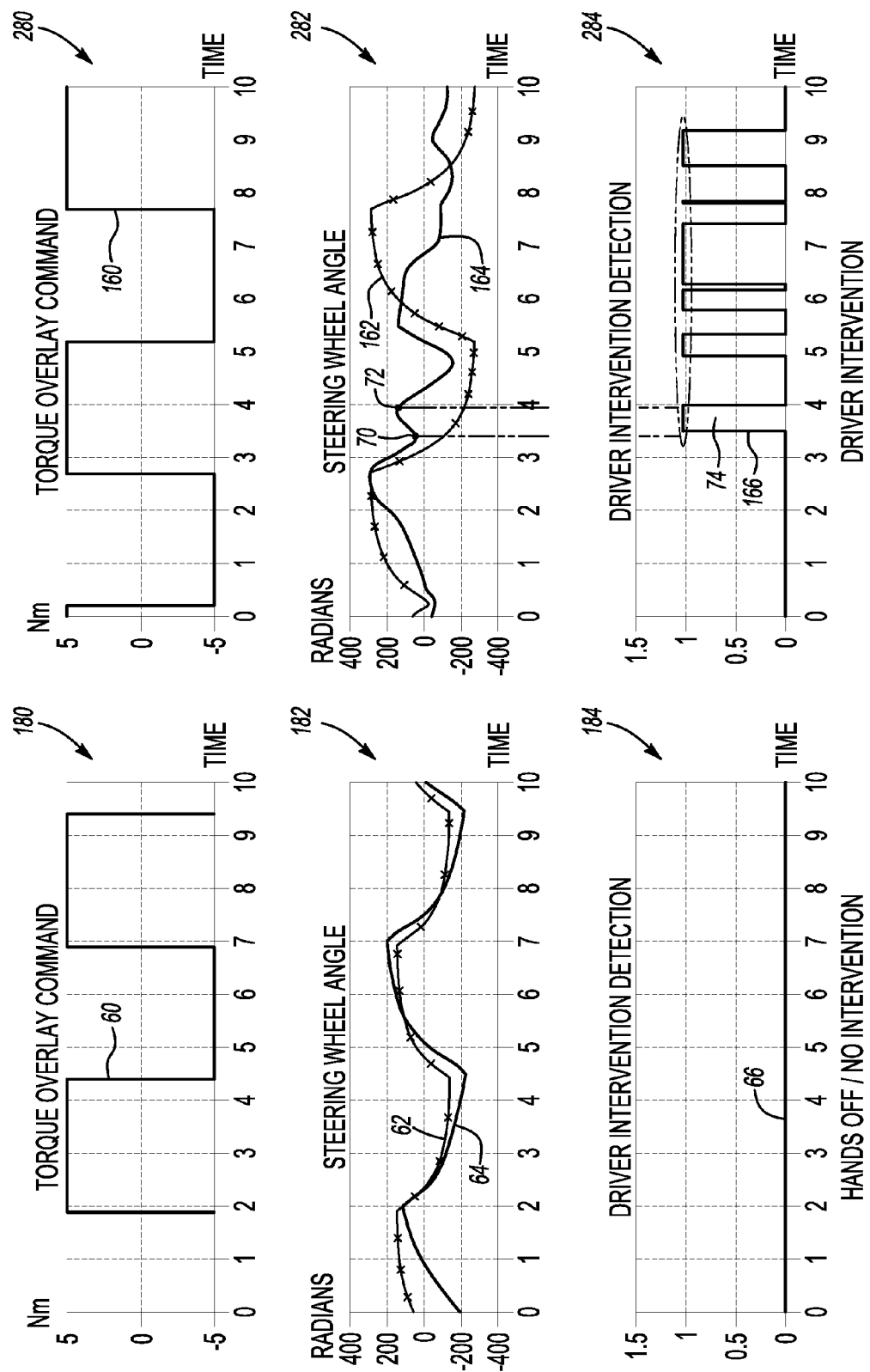
FIG. 3A is a graphical illustration of an exemplary set of modeled and measured signals describing a modeled "hands off"/no intervention control scenario.
FIG. 3B is a graphical illustration of an exemplary set of modeled and measured signals describing an intervention scenario.

Referring briefly to FIG. 3A, in modeling the steering dynamics in a hands-off state, the ECU 20 can generate and record or store a TOC model 180, a steering wheel angle model 182, and a driver intervention detection model 184, collectively referred to hereinafter as the Driver Steering Model. The TOC model 180 includes a TOC signal 60, shown here as an exemplary square wave, but which also can be a sinusoidal wave or other suitable waveform. The steering wheel angle model 182 includes the measured steering angle ($\theta_S$) as represented by the curve 64, and a simulated or calculated steering angle ($\theta_{CALC}$) as represented by the curve 62. The driver intervention detection model 184 includes a driver intervention signal 66, shown here as zero to indicate a hands-off/no intervention state.

The DSM of models 180, 182, and 184 form a baseline or reference set of values representing the hands-off state described above, wherein the driver intervention detection model 184 indicates less than a threshold amount of variance between a simulated or calculated steering angle ($\theta_{CALC}$) as determined by the ECU 20 and the measured steering angle ($\theta_S$), as correlated with the TOC model 180 and the steering wheel angle model 182.

In one exemplary embodiment, the process of modeling steering system dynamics to produce the DSM is accomplished via a second-order transfer function. That is, when a driver's hands are off of the steering wheel 12, or when the driver otherwise does not exert a meaningful or significant level of steering torque on the steering wheel 12, the following second-order transfer function applies:

$$J_s\ddot{\theta}_s + B_s\dot{\theta}_s + K_s\theta_s \approx KT_{cmd}$$

wherein $J_s$ describes the steering system moment of inertia, $B_s$ describes the steering damping coefficient, $K_s$ describes the steering spring coefficient, $K$ describes a proportional gain, and $T_{cmd}$ describes the TOC. From this function:

$$\frac{\Theta_s(s)}{T_{cmd}(s)} = \frac{K/J_s}{s^2 + \left(\frac{B_s}{J_s}\right)s + \frac{K_s}{J_s}} = \frac{K_{ss}\omega_n^2}{s^2 + 2\zeta\omega_n s + \omega_n^2}$$

wherein $\zeta$ describes the damping ratio, $\omega_n$ describes the natural frequency of the steering system, $K_{ss}$ describes the gain, and s describes the frequency domain variable per the Laplace transform. Based on experimental data, each of the unknown variables, i.e., the damping ratio $\zeta$, the natural frequency $\omega_n$, and the gain $K_{ss}$, can be estimated. Once the DSM 180 of FIG. 3A is fully modeled and recorded, the algorithm 100 proceeds to step 104.

Referring again to FIG. 2, at step 104, an internal flag or other indicator can be set within the ECU 20 to signal that the driver of the vehicle 10 does not presently intend to override the torque overlay operation during the EPS-assisted steering maneuver. For example, a flag can be set to "FALSE", "F", "0", "OFF", or any other suitable value. This default condition allows the normal operation of the EPS system aboard the vehicle 10 of FIG. 1 during the threshold EPS state, without any appreciable intervention or interference in the steering maneuver by the driver. Once the flag is properly set, or when conditions otherwise are determined to be entirely consistent with a non-intervention state, the algorithm 100 proceeds to step 106.

At step 106, the algorithm 100 includes measuring, sensing, or otherwise detecting the steering angle ($\theta_S$) using the angle sensor 14. For example, the angle sensor 14 can generate a proportional voltage signal of a sign and amplitude corresponding to the measured steering angle, and can transmit or relay this value to the ECU 20. Once measured, the algorithm 100 proceeds to step 108.

At step 108, the measured steering angle ($\theta_S$) is filtered with a high-pass filter to obtain a noise signal of the steering angle ($\theta_S$), which is compared to a calibrated or allowable threshold range to determine if a significant noise angle is being detected at the steering wheel 12. If the noise of the steering angle ($\theta_S$) measured at step 106 is within the allowable threshold range, the algorithm 100 is finished. Otherwise, the algorithm 100 proceeds to step 110.

At step 110, the torque overlay command (TOC) from the ECU 20 as determined by the map 34 of the ECU 20, an the DSM modeled at step 102, are used to compute a calculated steering angle ($\theta_{CALC}$), i.e., a simulated or required steering angle as determined by the ECU 20. Once calculated, the algorithm 100 proceeds to step 112.

At step 112, the gradients or slopes of the values of the calculated steering angle ($\theta_{CALC}$) of step 110 and the measured steering angle ($\theta_S$) of step 106 are determined. The algorithm 100 then proceeds to step 114.

At step 114, the algorithm 100 calculates a variance or difference (AG) between the calculated gradients from step 112, and compares this difference to an allowable or calibrated threshold range. If the difference (AG) is within the allowable range, the algorithm 100 is finished, and returns to start on its next initiation. That is, having determined that the driver does not presently intend to abort or override the torque overlay operation of the EPS-assisted steering maneuver, the algorithm 100 allows the TOC to be applied in the usual manner. However, if the difference (AG) falls outside of the allowable range, the algorithm 100 proceeds to step 116.

Referring briefly to FIG. 3B, the ECU 20 can generate and record or store a TOC profile 280, a steering wheel angle profile 282, and a driver intervention profile 284, similar to the profiles 180, 182, and 184 described above with reference to FIG. 3A. The driver intervention profile 284 of FIG. 3B indicates more than a threshold amount of variance or difference between a simulated and a measured steering wheel angle, as correlated with the TOC signal 160 of the TOC profile 280 and the steering wheel angle profile 282.

As shown in the steering wheel angle profile 282, beginning at point 70 and ending at point 72, the measured steering angle ($\theta_S$) represented by the curve 164 is being applied in the opposite direction of the calculated steering angle ($\theta_{CALC}$), i.e., the curve 162. That is, the gradient or slope of curve 164 turns positive at point 70, while the gradient or slop of curve 162 continues in the negative direction for the same time period. As shown in the driver intervention profile 284, this result is correlated with a positive (+1) driver intervention result, thus potentially indicating a present driver intention to steer independently of the EPS system. Gradient or slope differences between the curves 162 and 164 also occur at various times subsequent to t=4, as represented in the driver intervention profile 284, with each occurrence corresponding to a positive (+1) result in the driver intervention profile 284, as shown by the peak 74 in the curve 166.

Referring again to FIG. 2, at step 116 the algorithm 100 processes the steering torque ($T_S$) from the torque sensor 15 positioned in proximity to the torsion bar 30 through a low-pass filter having a predetermined cutoff frequency, and then temporarily stores the filtered torque value in memory, thereby isolating a predetermined low-frequency portion of the proportional voltage signal or other signal describing the steering torque ($T_S$). Once filtered, the algorithm 100 proceeds to step 118.

At step 118, the algorithm 100 determines whether the filtered value determined at step 116 is within an allowable threshold range, as more than a threshold amount of low-frequency torque signal can be indicative of hands-on/intervention by the driver. Therefore, the algorithm 100 determines if the low-frequency torque signal is consistent with a threshold allowable minimum. If so, the algorithm 100 is finished. Otherwise, the algorithm 100 proceeds to step 120 and continues to evaluate additional vehicle signals or values.

At step 120, the algorithm 100 processes an actual motor torque signal ($T_{M,ACTUAL}$) through a high-pass filter in order to isolate a high-frequency portion of the motor torque, and to thereby evaluate a high-frequency noise component therein. Once filtered, the algorithm 100 proceeds to step 122.

At step 122, the amplitude or magnitude of the isolated or filtered high-frequency noise component from step 120 is computed or calculated. The algorithm 100 then proceeds to step 124 to determine if the computed magnitude from step 120 exceeds an allowable threshold. When a driver actively steers or when the driver's hands are placed on the steering wheel 12, the actual motor torque ($T_{M,ACTUAL}$) from the steering motor 26 can exhibit a large high-frequency noise component. If the high-frequency noise component computed at step 122 is less than an acceptable level as determined at step 124, a hands-off/no intervention state might be indicated. If the noise component computed at step 122 is less than an acceptable level, the algorithm 100 is finished. However, if the high-frequency noise component computed at step 122 exceeds an acceptable level, the algorithm 100 proceeds to step 126.

At step 126, the flag from step 102 can be reset to "TRUE", "T", "1", "ON", or any other suitable value to indicate that the driver presently intends to abort or override the torque overlay operation during the threshold EPS-assisted steering maneuver. Once the flag is properly set, or conditions are otherwise determined to be consistent with an override or abort state, the algorithm 100 proceeds to step 128.

At step 128, the algorithm 100 executes a suitable control action in response to the determination that the driver intends to override the torque overlay operation during the EPS maneuver by temporarily blocking, overriding, or aborting the torque overlay operation. The driver thus quickly and smoothly regains steering authority in the conventional manner without being counteracted or otherwise opposed by a contrary torque overlay command from the ECU 20.

As shown in the exemplary embodiment of FIG. 2, the various outputs from steps 108, 114, 118, and 124 can be considered or weighed by the ECU 20 using AND logic, with a present intent to override or abort the torque overlay operation indicated by a true result of the AND operation. That is, step 128 is reached if and only if each of steps 108, 114, 118, and 124 result in a determination that more than an allowable corresponding limit or threshold has been detected or calculated. However, while AND logic is shown in the exemplary embodiment of FIG. 2, those of ordinary skill in the art will recognize that other logic can be used to determine or fine-tune the sensitivity of the driver intention determination capability of the algorithm 100, including but not limited to a weighted sum approach, a voting approach, etc. In this manner, rather than giving each of the steps 108, 114, 118, and 124 equal weights, the actual variation from the threshold can be quantified, and each step can be assigned a corresponding weight or significance value based on the predictive value of the various measurements.

Accordingly, using the ECU 20 in conjunction with the algorithm 100 as set forth above, human-machine interface (HMI) can be optimized for EPS-based driver assist and semi-autonomous steering controls, e.g., lane changes, lane centering, autonomous parking, etc., without requiring additional sensory devices or hardware.

While the best modes for carrying out the invention have been described in detail, those familiar with the art to which this invention relates will recognize various alternative designs and embodiments for practicing the scope of the invention within the scope of the appended claims.

The invention claimed is:

1. A method for controlling a steering maneuver of a vehicle having an electric power steering (EPS) system, an electronic control unit (ECU), and a steering wheel, the method comprising:
   modeling a set of steering dynamics during a predetermined EPS state having an active torque overlay operation to thereby generate a dynamic steering model (DSM);
   measuring a set of vehicle operating values using at least one sensor;
   transmitting the set of vehicle operating values from the at least one sensor to the ECU;
   processing the set of vehicle operating values and the DSM via the ECU to thereby detect a driver intervention, wherein the driver intervention corresponds to a driver intent to override the torque overlay operation; and
   automatically overriding the torque overlay operation via the ECU when the driver intervention is detected.

2. The method of claim 1, wherein modeling a set of steering dynamics during a predetermined EPS state includes using a second-order transfer function to model the set of steering dynamics when the driver is not applying at least a threshold amount of steering torque to the steering wheel.

3. The method of claim 1, wherein measuring a set of vehicle operating values using at least one sensor includes: measuring a steering angle using a first sensor and measuring a steering torque using a second sensor.

4. The method of claim 1, wherein processing the set of vehicle operating values includes: comparing at least one of a steering angle and a steering torque value to a corresponding calibrated threshold.

5. The method of claim 1, wherein the EPS includes a steering motor having an actual motor torque value, wherein processing the set of vehicle operating values includes at least one of: processing a steering torque value through a low-pass filter to isolate a low-frequency torque signal and passing the actual motor torque value through a high-pass filter to isolate a high-frequency noise component.

6. The method of claim 5, wherein processing the set of vehicle operating values further includes: comparing at least one of the low-frequency torque signal and the high-frequency noise component to a corresponding threshold.

7. A method for controlling a steering maneuver in a vehicle having a steering device, an electric power steering (EPS) system operatively connected to the steering device, and a steering wheel mechanically coupled to the steering device, the EPS system including an electronic control unit (ECU) and a steering motor connected to the steering device and configured to selectively assist in execution of the steering maneuver, the method comprising:
   generating a dynamic steering model (DSM) for a hands-off EPS state, wherein the hands-off EPS state describes an EPS state during which a driver of the vehicle is applying less than a threshold minimum amount of steering torque to the steering wheel during an active torque overlay operation;
   recording the DSM via the ECU;
   measuring a set of vehicle operating values, including measuring a steering angle imparted to the steering wheel using an angle sensor and measuring a steering torque applied to the steering device using a torque sensor;
   transmitting the steering angle and the steering torque to the ECU;
   processing the set of vehicle operating values via the ECU to thereby detect a driver intervention corresponding to a driver intent to override the torque overlay operation, including comparing a low-frequency noise component of the steering torque and a high-frequency noise component of an actual motor torque of the steering motor to a corresponding threshold; and
   using the ECU to override the torque overlay operation when the driver intervention is detected.

8. The method of claim 7, wherein processing the set of vehicle operating values includes:
   computing a calculated steering angle;
   computing a gradient of each of the calculated steering angle and the measured steering angle;
   calculating a difference between the gradients; and
   comparing the difference to an allowable threshold.

9. The method of claim 7, wherein the steering device is configured as a dual rack-and-pinion device having a torsion bar, and wherein measuring a set of vehicle operating values includes measuring the steering torque within the torsion bar using the torque sensor.

10. The method of claim 7, wherein generating a dynamic steering model (DSM) for a hands-off EPS state includes using a second-order transfer function to model the DSM.

11. A vehicle comprising:
   a steering wheel;
   an electric power steering (EPS) system having:
   a rack-and-pinion device having a moveable rack portion;
   a steering motor operatively connected to the rack portion, wherein the steering motor transmits a motor output torque in response to rotation of the steering wheel to thereby assist in a movement of the rack portion;
   an angle sensor which measures a steering angle of the steering wheel; and
   an electronic control unit (ECU) in electrical communication with the angle sensor and the steering motor, wherein the ECU for selectively transmits a torque overlay command (TOC) to modify the motor output torque during a predetermined EPS-assisted steering maneuver, and is configured to:
      determine a present intent of a driver of the vehicle to interrupt an application of the TOC using a set of vehicle operating values, including the steering angle; and
      interrupt the transmission of the TOC when the present intent of the driver to interrupt the application of the TOC is determined.

12. The vehicle of claim 11, further comprising a torque sensor, wherein the rack-and-pinion device includes a torsion bar, and wherein the torque sensor measures a steering torque with respect to the torsion bar as part of the set of vehicle operating values.

13. The vehicle of claim 11, wherein the ECU is configured to model a set of steering dynamics during a hands-off EPS-assisted steering maneuver to thereby generate a dynamic steering model (DSM), the hands-off EPS-assisted steering maneuver corresponding to a threshold minimum amount of steering torque being applied to the steering wheel by a driver of the vehicle during the torque overlay operation.

14. The vehicle of claim 11, wherein the ECU is configured to detect a threshold amount of high-frequency noise in an actual motor torque of the steering motor, and to determine the present intent of the driver based at least in part on the amount of high-frequency noise.

15. The vehicle of claim 14, wherein the ECU is configured to detect the threshold amount of high-frequency noise in part by processing the actual motor torque through a high-pass filter.

16. The vehicle of claim 11, wherein the ECU is configured to detect a threshold amount of low-frequency torque signal in an actual motor torque of the steering motor, and to detect the driver intervention based at least in part on the amount of low-frequency torque signal.

17. The vehicle of claim 16, including a low-pass filter, wherein the ECU is configured to detect the threshold amount of low-frequency torque signal by processing the actual motor torque through the low-pass filter.

18. The vehicle of claim 11, wherein the ECU is configured to compare each of the steering angle, the steering torque, and an actual motor torque of the steering motor to a corresponding threshold, and to determine the present intent of the driver to interrupt the application of the TOC when each of the steering angle, the steering torque, and the actual motor torque exceed their corresponding threshold values.

* * * * *